No. 889,927. PATENTED JUNE 9, 1908.
C. L. HIGGINS.
AUTOMOBILE TIRE CASING.
APPLICATION FILED APR. 6, 1906.

Charles Leander Higgins, Inventor

UNITED STATES PATENT OFFICE.

CHARLES LEANDER HIGGINS, OF MONTREAL, QUEBEC, CANADA.

AUTOMOBILE-TIRE CASING.

No. 889,927.　　　　Specification of Letters Patent.　　　　Patented June 9, 1908.

Application filed April 6, 1906. Serial No. 310,337.

*To all whom it may concern:*

Be it known that I, CHARLES LEANDER HIGGINS, of the city of Montreal, Province of Quebec, Canada, have invented certain new and useful Improvements in Automobile-Tire Casings; and I do hereby declare that the following is a full, clear, and exact description of the same.

The invention may be said briefly to consist in first cementing to a sheet of textile fabric equal in width to the tire to be constructed, a strip of leather with skived side edges. The skived edges are then coated with cement and a pair of strips of textile fabric, preferably frictioned, are then spread over the skived edges such strips being of sufficient width to extend in both directions beyond the said skived edges. A line of stitching is then run along each of the last mentioned strips in position to unite the same to the inner edge of each skived portion, and a second line connects these strips to the outer edges of the said skived portions. The portions of the strip extending inwardly beyond the skived edges are then folded over the lines of stitching and caused to adhere firmly to the surface over which it is folded. Soft uncured rubber is then spread in the usual way over the fabric surface thus presented and it is decreased in thickness towards the unskived portion of the leather thus providing a scarf joint and presenting a plane exterior rubber surface with the leather extending longitudinally through and countersunk or inlaid in the middle thereof. The tread is then secured in place preferably by comparatively large headed rivets, and finally the whole is vulcanized in the usual manner.

Figure 1:
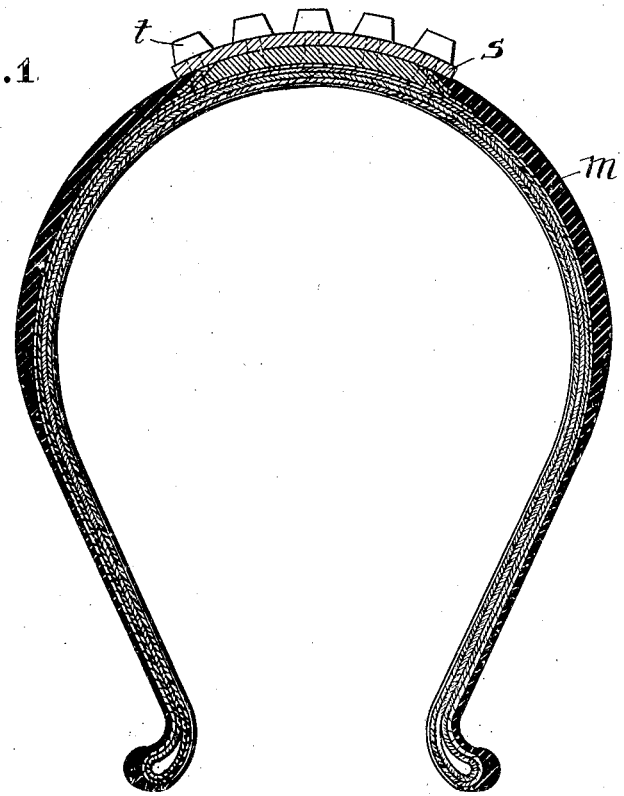
Figure 2:
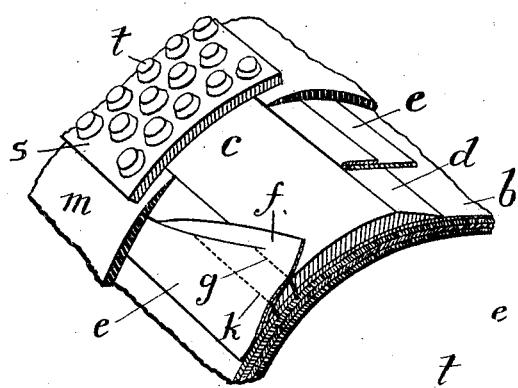
Figure 4:
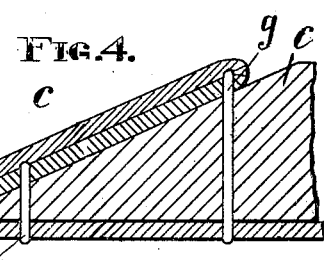
Figure 3:
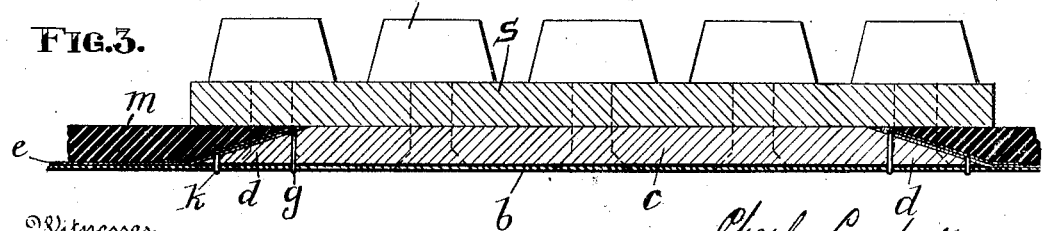

For full comprehension, however, of my invention reference must be had to the accompanying drawings forming a part of this specification, in which similar reference characters indicate the same parts and wherein Figure 1 is a transverse sectional view of a tire casing made according to my invention; Fig. 2 is a detail sectional perspective view thereof; and Fig. 3 is an enlarged detail sectional view of the portion thereof contiguous to the tread, to which portion my invention has particular reference. Fig. 4 is an enlarged detail sectional view illustrating particularly the method of stitching the parts together.

The textile fabric I use is that known to the rubber trade as "frictioned stock" and it is cut to dimensions equaling the width and circumferential length of the usual outermost layer of the tire casing which it constitutes. It is to this outer layer, $b$, that my invention relates and its object is to reinforce and provide a more durable casing.

A strip $c$ of leather constituting an "inter tread" and having its side edges skived, as at $d$, is cemented along the middle of the length $b$ of "frictioned stock", the skived edges being then coated with cement and a pair of comparatively narrow lengths $e$ of "frictioned stock" are spread longitudinally over such skived edges and the portions of the outer layer $b$ contiguous to the same, while the width of these strips is preferably sufficient to provide material, $f$, to fold back upon the portions covering the said skived edges. Before thus folding the narrow strips they are caused to adhere to the surfaces upon which they lie by first passing a roller over them and then running lines of stitching $g$ and $h$ in positions to pass through the skived edges near the top and bottom thereof. The folding is then done and the roller again passed over the folded portion thereby presenting a uniform surface of "frictioned stock" to the outer coating of uncured rubber, and at the same time protecting the lines of stitching. The outer coating $m$ of soft uncured rubber is then spread in the usual way over the exposed surface of "frictioned stock" and diminished in thickness to present a scarf-joint with the skived edges of the inter tread and the portions of the "frictioned stock" upon the latter. The outer tread $s$ is then secured to the "inter tread" $c$ and the layer $b$ by rivets $t$ and such tread is preferably of a width to have its side edges extend slightly beyond the scarf-joint, and finally the whole is vulcanized after which the casing is ready for use.

This invention is equally applicable to the construction of tires, and in casings or tires embodying my improvements the inter tread is practically made an integral part of the whole and affords a means whereby the outer tread is rigidly secured in place, while the stitching is thoroughly protected.

What I claim is as follows:—

1. In the manufacture of coverings for tire casings and the like, cementing a strip of leather with its side edges skived to a layer of "frictioned stock", cementing a pair of narrow strips of "frictioned stock" along such skived edges, coating the exposed surfaces of "frictioned stock" with uncured rubber, and finally vulcanizing the whole.

2. In the manufacture of coverings for tire casings and the like, cementing an intertread with its side edges skived to a layer of "frictioned stock", cementing a pair of narrow strips of "frictioned stock" along such skived edges, stitching the said strips in place, folding a portion of each strip over the lines of stitching, coating the exposed surfaces of "frictioned stock" with uncured rubber, securing an outer tread upon the exterior of the intertread, and finally vulcanizing the whole.

3. An outer wall of a tire comprising a layer of "frictioned stock", a strip of leather cemented to such layer along the middle thereof, strips of "frictioned stock" extending along the edges of such leathern strip and overlapping the portions contiguous thereto of the "frictioned stock", lines of stitching connecting the said layer the intertread and last mentioned strips together, a coating of vulcanized rubber covering the exposed outer surfaces of the "frictioned stock", an outer tread, and means securing the latter upon the exterior of the intertread.

4. An outer wall of a tire comprising a layer of "frictioned stock", a strip of leather cemented to such layer along the middle thereof and having its side edges skived, strips of "frictioned stock" cemented to the skived edges of such leathern strip and overlapping the portions contiguous thereto of the "frictioned stock", lines of stitching connecting the said layer the intertread and last mentioned strips together, such lines of stitching extending along the inner edges of the skived portions and adjacent to the outer edges thereof and such strips being folded over the said lines of stitching, a coating of uncured rubber covering the exposed outer surfaces of the "frictioned stock", an outer tread, and means securing the latter upon the exterior of the intertread.

5. An outer wall of a tire comprising a layer of "frictioned stock", a strip of leather cemented to such layer along the middle thereof, strips of "frictioned stock" extending along the edges of such leathern strip and overlapping the portions contiguous thereto of the "frictioned stock", lines of stitching connecting the said layer the intertread and last mentioned strips together, a coating of vulcanized rubber covering the exposed outer surfaces of the "frictioned stock", an outer tread and means securing the latter upon the exterior of the intertread.

In testimony whereof, I have signed my name to this specification, in the presence of two subscribing witnesses.

CHARLES LEANDER HIGGINS.

Witnesses:
WILLIAM P. McFEAT,
FRED J. SEARS.